(12) United States Patent
Narayan et al.

(10) Patent No.: US 12,040,982 B2
(45) Date of Patent: Jul. 16, 2024

(54) SYSTEMS AND METHODS FOR OPTIMAL ROUTING IN SITES WITH MULTIPLE ROUTERS FOR HIGH AVAILABILITY WIDE AREA NETWORKS

(71) Applicant: Arista Networks, Inc., Santa Clara, CA (US)

(72) Inventors: Abhijith Kudupu Narayan, Santa Clara, CA (US); Venkitraman Kasiviswanathan, San Ramon, CA (US); Alton Lo, Freemont, CA (US); Udayakumar Srinivasan, Santa Clara, CA (US); Kumaran Narayanan, Santa Clara, CA (US); Tarun Soin, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 193 days.

(21) Appl. No.: 17/584,765

(22) Filed: Jan. 26, 2022

(65) Prior Publication Data
US 2023/0127962 A1 Apr. 27, 2023

Related U.S. Application Data

(60) Provisional application No. 63/270,292, filed on Oct. 21, 2021.

(51) Int. Cl.
*H04L 47/24* (2022.01)
*H04L 45/02* (2022.01)

(52) U.S. Cl.
CPC .............. *H04L 47/24* (2013.01); *H04L 45/02* (2013.01)

(58) Field of Classification Search
CPC ................................. H04L 47/24; H04L 45/02
See application file for complete search history.

(56) References Cited

U.S. PATENT DOCUMENTS

| | | | |
|---|---|---|---|
| 2019/0036814 A1* | 1/2019 | Aranha | H04L 45/64 |
| 2020/0059457 A1* | 2/2020 | Raza | H04L 69/14 |
| 2021/0036987 A1* | 2/2021 | Mishra | H04L 61/2592 |
| 2021/0288881 A1* | 9/2021 | Zhang | H04L 12/4633 |
| 2022/0131898 A1* | 4/2022 | Hooda | H04L 63/1433 |

* cited by examiner

*Primary Examiner* — Donald L Mills
(74) *Attorney, Agent, or Firm* — Tianyi He

(57) ABSTRACT

A method for transmitting network traffic across a wide area network (WAN) from a first site to a second site is provided. The method is executed by a first edge network device at the first site that further includes a second edge network device, and the method includes: receiving the network traffic from a client device at the first site; determining, using ipath characteristics and a classification of the network traffic, that the network traffic should be transmitted by the second edge network device to the second site; forwarding in response to the determination, the network traffic to the second edge network device using a local tunnel over a local area network (LAN) of the first site such that the network traffic is transmitted to the second site by the second edge network device.

20 Claims, 10 Drawing Sheets

SYSTEMS AND METHODS FOR OPTIMAL ROUTING IN SITES WITH MULTIPLE ROUTERS FOR HIGH AVAILABILITY WIDE AREA NETWORKS

CROSS-REFERENCE TO RELATED APPLICATIONS

This application claims priority to U.S. Provisional Patent Application No. 63/270,292 filed Oct. 21, 2021, the entire contents of which are incorporated herein by reference.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
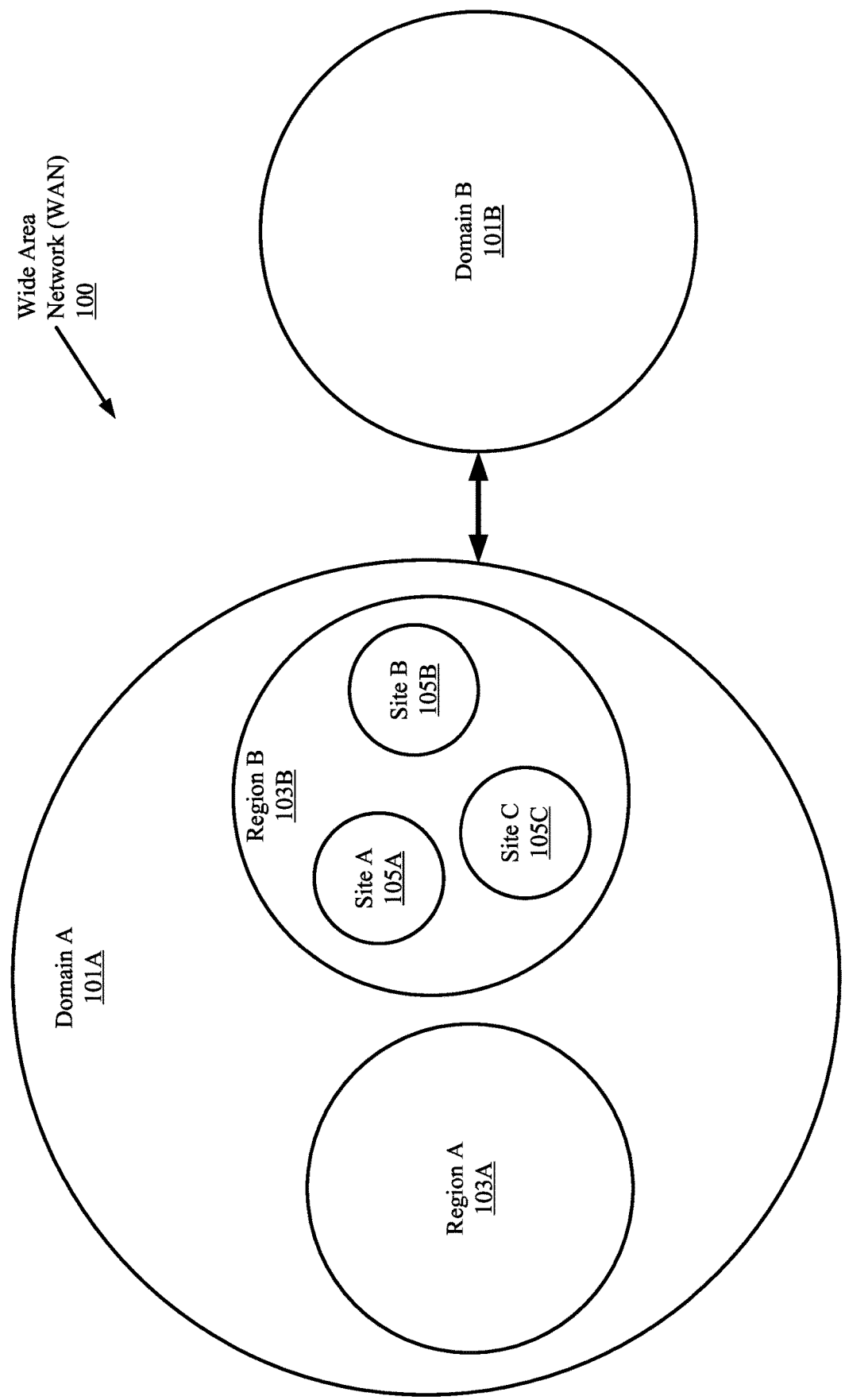
FIG. 1A shows an example of a wide area network (WAN) in accordance with one or more embodiments.

Specific embodiments will now be described with reference to the accompanying figures.

A wide area network (WAN) (also referred to herein as "enterprise network") can be hierarchically divided into multiple parts (e.g., domains, regions, sites, etc.). To provide high availability (HA), each site of the WAN may include multiple edge network devices that are connected to edge network devices of other sites through one or more different service provider (SP) networks (e.g., Internet, Multiprotocol Label Switching (MPLS), etc.).

However, each edge network device may only be aware of path characteristics (e.g., tunnel performance characteristics such as jitter, latency, bandwidth, etc.) associated with service provider connection to which it is directly connected. This prevents the edge network devices at each site from determining the most optimal path for each network traffic being transmitted. For example, a site may include edge network device A connected to a service provider connection such as MPLS and edge network device B connected to another service provider connection such as the Internet (or yet another service provider connection using a different point of the MPLS network). Edge network device A may receive network traffic that is more suited to be transferred across the Internet connection (e.g., the network traffic is large and the Internet connection includes a larger bandwidth). However, edge network device A is unaware that edge network device B is connected to the Internet and proceeds to transmit the network traffic in a less optimal fashion.

One or more embodiments disclosed herein further improves upon the HA of each site by making the path characteristics of each service provider connection available (i.e., known) to all edge network devices at a site. In one or more embodiments, a set of local tunnels (e.g., dynamic path selection (DPS) tunnels) are built between each edge network device over a local area network (LAN) of each site for forwarding network traffic between the edge network devices. Path characteristics of each service provider connection measured by each edge network device are transmitted to all other edge network devices within the same site using the LAN (e.g., using transmission control protocol (TCP) based means/mechanisms over the LAN). This is an example of a network controller-less configuration of one or more embodiments disclosed herein (the network controller to be described in more detail below). As a result, according to one or more embodiments, each edge network device at a site will have a complete picture of all possible paths for transmitting the network traffic to a different site. This advantageously allows an edge network device to select a most-optimal route for transmitting a network traffic it receives from a client device. With regard to the local tunnels discussed above, one of ordinary skill in the art would appreciate that any type of tunnels can be used without departing from the scope of or more embodiments disclosed herein. Alternatively, instead of using tunnels, the network traffic may be forwarded to any high availability (HA) peer (e.g., any edge network device) directly using a destination address (e.g., a destination media access control (MAC)) address) of the edge network device selected to receive the network traffic.

In one or more embodiments, instead of sharing path characteristics using the LAN, the edge network devices transmit the measured path characteristics of the service provider connection(s) to which they are directly connected to a network controller using techniques such as, but is not limited to, border gateway protocol (BGP). This is an example of a network controller based configuration of one or more embodiments disclosed herein (the network controller to be described in more detail below). More specifically, the network controller aggregates all the measured path characteristics for a single site and distributes the aggregated path characteristics to all of the edge network devices for that single site. The network controller may also distribute the aggregated path characteristics to edge network devices disposed at remote sites. As a result, according to one or more embodiments, each edge network device at a site will have a complete picture of all possible paths for transmitting the network traffic to a different site. For example, network traffic received at one edge network device may transmit (i.e., be forwarded) through the other edge network devices of the same site to reach a different site.

Various embodiments of the disclosure are described below.

FIG. 1A shows an example wide area network (WAN) (100) in accordance with one or more embodiments disclosed herein. The WAN (100) may be a telecommunications network that extends over a large geographic area for implementing computer networking features. As shown in FIG. 1A, the WAN (100) may be divided into a hierarchy including, but not limited to, domains (101A, 101B), regions (103A, 103B), and sites (105A-105C). As one example, each domain (101A, 101B) may cover a continent (e.g., North America, Europe, etc.), each region (103A, 103B) may cover some or more states, cities, and/or provinces within the domain (101A, 101B), and each site may represent a physical location (and/or virtual instance thereof) (e.g., a building such as an office, school, hospital, etc.) within a region (103A, 103B).

Although the WAN (100) of FIG. 1A is shown as having only two domains (101A, 101B), two regions (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion of (e.g., half) of a continent rather than a full area of the continent.

Figure 1B:
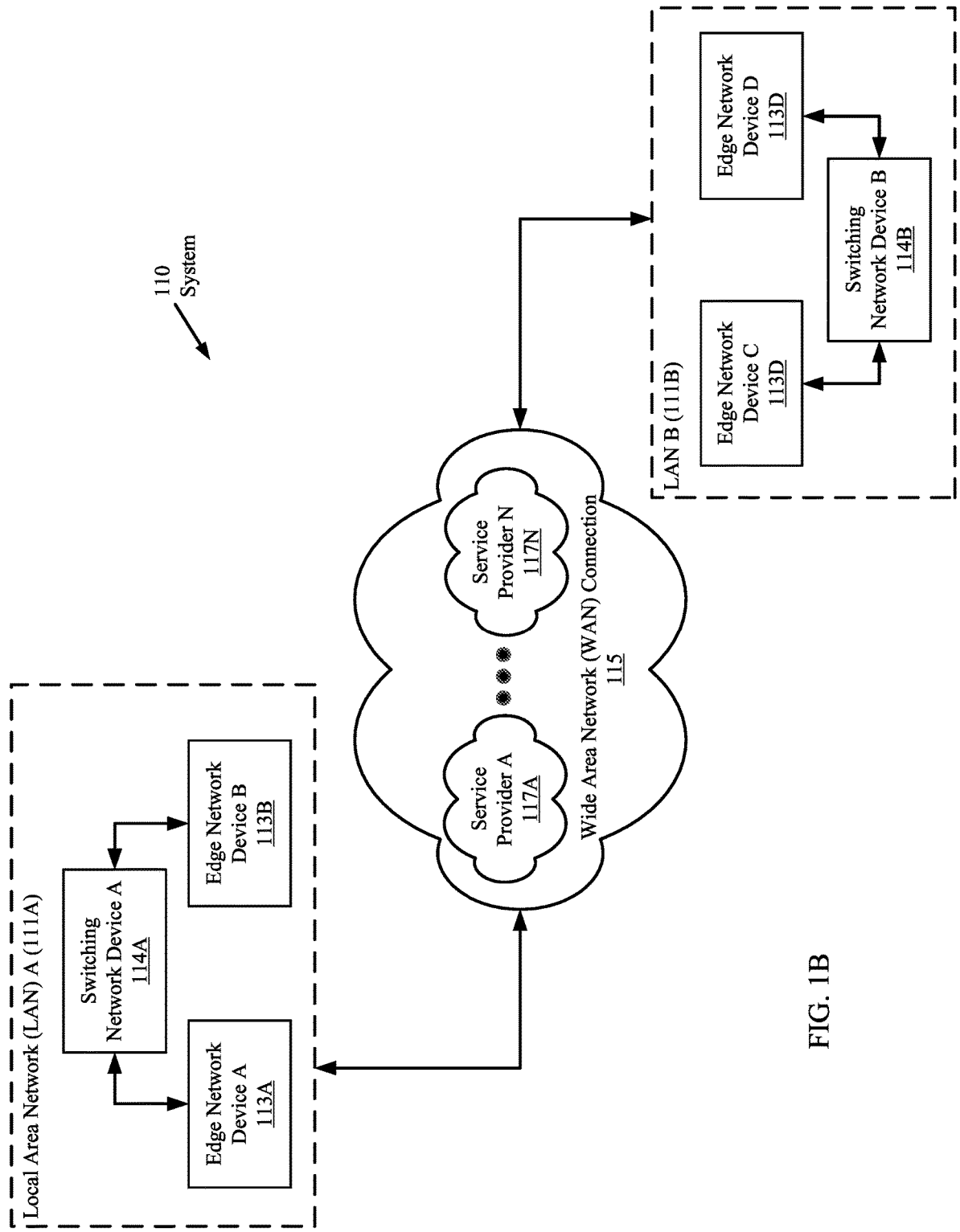
FIG. 1B shows a system in accordance with one or more embodiments described herein.

In one or more embodiments, each domain (101A, 101B), region (103A, 103B), and site (105A-105C) of the WAN (100) may include network devices (discussed in more detail below in FIG. 1B) that are able to communicate (e.g., transfer information in the form of network traffic such as data packets) with one another using one or more service providers (e.g., 119A, 119N). As an example, each site (105A-105C) may be configured with respective ones of a local area network (LAN) (e.g., 111A-111B; FIG. 1B) made up of one or more edge network devices (e.g., 113A, 113N, FIG. 1B) and switching network devices (e.g., 114A, 114B; FIG. 1B). Each region may include at least one of the edge network devices that is configured as a relay point (e.g., a transfer hub) for the network devices within that region to communicate with network devices in other regions (including regions of other domains). The network device configured as the transfer hub may also be located at any one of the sites (105A-105C) along with the other edge network devices. Additionally, each domain (101A, 101B) may have a network controller (not shown; discussed below in reference to FIG. 1B) in charge of controlling and/or monitoring the network devices within that domain.

A more detailed example of how network devices in each LAN (e.g., sites (105A-105C)) communicate with network devices in other LANs in the WAN (100) is provided below in reference to FIG. 3A.

FIG. 1B shows a system (110) in accordance with one or more embodiments of the disclosure. As discussed above, the system (110) may include components that are physically located within each hierarchical level of the WAN (100). In particular, the system (110) includes one or more local area networks (LANs) (111A, 111B) and a wide area network (WAN) connection (115). Each LAN (111A, 111B) includes one or more edge network devices (113A-113D) and one or more switching network devices (114A, 114B). Each WAN includes one or more service providers (117A, 117N). Each of these components of the system (100) is described below.

In one or more embodiments disclosed herein, the LANs (111A, 111B) may be any type of localized computer network that interconnects devices (e.g., computing devices, network devices, etc.) within a limited area such as a site (e.g., residence, school, laboratory, university campus, office building, etc.) within the enterprise network hierarchy. Each LAN (111A, 111B) may be composed of a collection of network devices (e.g., a combination of the edge network devices (113A-113D) and the switching network devices (114A, 114B)) and non-network devices (e.g., personal computing devices such as tablets, laptop computers, desktop computers, smartphones, etc.). In one or more embodiments, each of the LANs (11A, 111B) may include any combination of local network segments that may be wire-based and/or wireless and that may use any combination of wired and/or wireless communication protocols. In the context of the WAN (100) of FIG. 1A, each LAN may represent a site (e.g., 105A-105C; FIG. 1A) within the WAN (100).

In one or more embodiments disclosed herein, the one or more edge network device(s) (113A-113D) are physical devices (e.g., the computing system of FIG. 4) that include persistent storage, memory (e.g., random access memory), one or more processor(s) (including a switch chip), and two or more physical ports. An example of the edge network devices (113A-113D) may be, but is not limited to, an edge router that is connected to one or more client devices (not shown) (e.g., computers, laptops, smartphones, tablets, etc.) through the switching network devices (114A, 114B) (discussed in more detail below). In the context of one or more embodiments disclosed herein, the edge network device may be any type of network device that enables an internal network (e.g., the LANs (11A, 111B)) to connect to external networks (e.g., WAN connection (115)).

The switch chip is hardware that determines which egress port on an edge network device (113A-113D) to forward packets (which may be in the form of media access control (MAC) frames). The switch chip may include egress and ingress ports that may connect to ports on the edge network device (113A-113D). Each port may or may not be connected to another device (e.g., a server, a switch, a router, etc.). The edge network device (13A-113D) may be configured to receive the packets via the ports.

Additionally, the persistent storage in the edge network device (113A-113D) may include any type of non-transitory computer readable medium that stores data. For example, the data in the persistent storage may be instructions, which, when executed by one or more processor(s) in the edge network device (113A-113D), enable the edge network device (113A-113D) to perform one or more functions of the edge network device (13A-113D). Additional details of the edge network device(s) (113A-113D) are discussed below in FIG. 1C.

In one or more embodiments disclosed herein, similar to the edge network devices (113A-113D), the one or more switching network device(s) (14A, 114B) are physical devices (e.g., the computing system of FIG. 4) that include persistent storage, memory (e.g., random access memory), one or more processor(s) (including a switch chip), and two or more physical ports. Examples of the switching network devices (114A, 114B) include, but are not limited to, a switch, a top of rack (TOR) switch, and a multilayer switch that are connected to one or more client devices (not shown) (e.g., computers, laptops, smartphones, tablets, etc.) and the edge network devices (113A-113D).

In one or more embodiments disclosed herein, the WAN connection (115) may be the medium through which the components (e.g., the edge network devices (113A-113D)) of each local area network (111A, 111B)) are connected. In the context of the WAN (100) described above in reference to FIG. 1A, the WAN connection (115) enables all of the components within the WAN (100) to communicate with one another.

In one embodiment of the disclosure, the WAN connection (115) may include other network devices (or systems) (not shown) that facilitate communication between the aforementioned components. As such, in one embodiment of the disclosure, the WAN connection (115) may include any combination of wide area (e.g., Internet) network segments that may be wire-based and/or wireless and that may use any combination of wired and/or wireless communication protocols.

In one or more embodiments disclosed herein, the WAN connection (115) may include one or more service providers (SPs) (117A, 117N) that provide the edge network devices (113A-113D) access to the WAN connection (115). For example, the service providers (117A, 117N) may be private (e.g., multiprotocol label switching (MPLS) providers) or public (e.g., internet service providers (ISPs), the Internet, etc.) service providers. The service providers (117A, 117N) are not limited to the aforementioned specific examples and may also include other types of service providers such as, for example, telecommunication service providers.

Although FIG. 1B is shown with each LAN (111A, 111B) including only a single switching network device (114A, 114B) and two edge network devices (113A-113D), one of ordinary skill in the art will appreciate that one or more embodiments disclosed herein is not limited to such a configuration shown in FIG. 1B. For example, each LAN (111A, 111B) may include any number (including zero (0)) of the switching network devices (114A, 114B) and the edge network devices (113A-113D).

Additionally, although not shown in FIG. 1B, the system (110) may further include a network controller. The network controller may be a physical (e.g., the computing system of FIG. 4) or virtual device that provides services (e.g., data aggregation and distribution services, path determination services, etc.) for the various devices connected by the WAN connection (115). For example, the physical device may be a server (i.e., a device with at least one or more processor(s), memory, and an operating system) that is directly or indirectly connected (e.g., via the WAN connection (115)) to the devices in each of the LANs (111A, 111B).

As discussed above, in the context of the WAN (100) in FIG. 1A, each domain (101A, 101B) may include a single network controller. However, one or more embodiments disclosed herein is not limited to this configuration. For example, each domain (101A, 101B) may include multiple ones of the network controller and each region (103A, 103B) with multiple sites (105A-105C) may also include one or more of the network controller. In general, the WAN (100) may include any number of network controllers at any hierarchical level of the WAN (100) without departing from the scope of one or more embodiments disclosed herein as long as each network controller is configured to control and/or monitor a group of network devices (e.g., the edge network devices (113A-113D)).

Figure 1C:
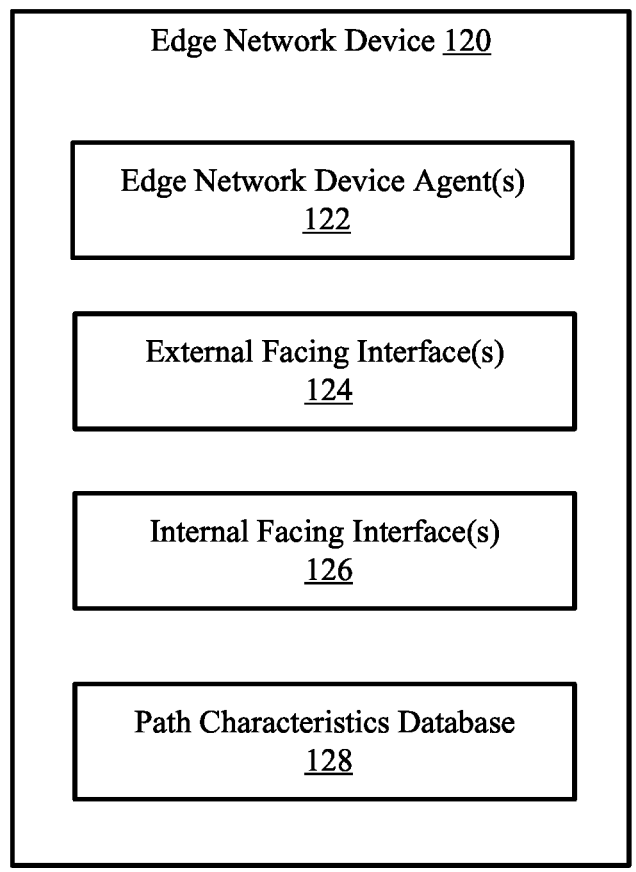
FIG. 1C shows an edge network device in accordance with one or more embodiments disclosed herein.

FIG. 1C shows an example edge network device (120) in accordance with one or more embodiments of the disclosure. The edge network device (120) may be any one of the edge network devices (113A-113D) discussed above in reference to FIG. 1B. In addition to the components discussed above in reference to FIG. 1B, the edge network device (120) further includes one or more edge network device agents (122), one or more external facing interfaces (124), one or more internal facing interfaces (126), and a path characteristic database (128). The edge network device (120) may include additional, fewer, and/or different components without departing from the disclosure. Each of the components illustrated in FIG. 1C is described below.

In one or more embodiments disclosed herein, the edge network device agent(s) (122) interacts with the other components of the edge network device (120). Each edge network device agent (122) facilitates the implementation of one or more protocols, services, and/or features of the edge network device (120). Examples of edge network device agents (122), include, but are not limited to, a bug-alerts agent, a policy agent that manages access control lists, a user interface agent, a routing information base agent, a forwarding information base agent, and a simple network management protocol (SNMP) agent. In one or more embodiments, one or more of the edge network device agents (122) may interact with the other components of the edge network device (120) to perform all or a portion of the functions described in accordance with one or more embodiments of the disclosure (see e.g., FIGS. 2 through 3).

In one or more embodiments disclosed herein, the external facing interfaces (124) are physical ports (or virtual instances thereof) connected only to other devices outside of (i.e., external to) the LAN (e.g., 111A-111B, FIG. 1B) to which the edge network device (120) belongs. For example, the external facing interfaces of the edge network device (120) may be connected, through one or more of the SPs (e.g., 117A-107N, FIG. 1B) of the WAN (e.g., 115, FIG. 1B), to that of other edge network devices that belong to different LANs. Examples of the external facing interface (124) include, but are not limited to, ingress and egress ports of the edge network device (120).

In one or more embodiments disclosed herein, the internal facing interfaces (126) are physical ports (or virtual instances thereof) connected only to other devices within the LAN to which the edge network device (120) belongs. For example, assuming that the edge network device (120) is the edge network device (103A) of LAN (101A) in FIG. 1B, the internal facing interfaces (126) of the edge network device (120) would be connected only to that of the edge network device (103B), the switching network device (104A), and/or any client devices within the LAN (101A). Examples of the internal facing interface (126) include, but are not limited to, ingress and egress ports of the edge network device (120).

In one or more embodiments disclosed herein, the path characteristics database (128) may be stored in a storage (not shown) of the edge network device (120) in the form of a data structure (e.g., a list, table, etc.). The path characteristics database (128) may include a collection of path information including reachability information and path characteristics.

In one or more embodiments, reachability information may include information with regard to paths (may also be referred to as "routes") that connect the edge network device (120) to other edge network devices in other LANs. Each of the paths between the edge network device (120) and the other edge network devices of the other LANs may be composed by one of the SP in the WAN that connects the edge network device (120) to the edge network devices of the other LANs. An example of a path is shown with more detail below in reference to FIG.

In one or more embodiments, the path characteristics may include information specifying one or more properties of the path (e.g., one or more properties of the SP) that reflects a quality of the path formed by the SP. For example, the path characteristics may include, but are not limited to, tunnel performance characteristics such as latency, jitter, loss, total bandwidth, current utilizations, etc.

One skilled in the art will recognize that the architecture of the system (110) and of the edge network device (120) is not limited to the components shown in FIGS. 1A-1C. For example, as discussed above in reference to FIG. 1B, the system (110) may include a network controller (not shown) and any number of LANs (111A, 111B). Further, the network controller (120) may include components (e.g., a processor, a storage, peripheral devices, etc.) not shown in FIG. 1C.

Figure 2A:
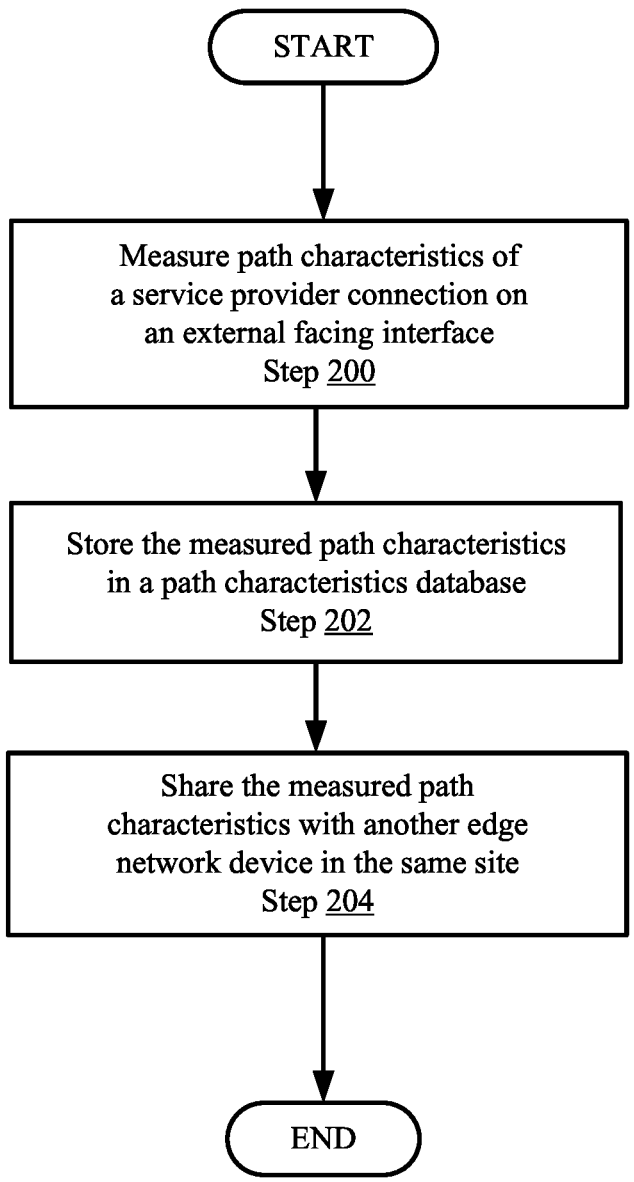
FIG. 2A-2C show flow charts in accordance with one or more embodiments.

FIG. 2A shows a flowchart of a method in accordance with one or more embodiments of the disclosure. The method depicted in FIG. 2A may be performed to configure a path characteristic database (e.g., 128, FIG. 1C) of an edge network device (e.g., 113A-113D, FIG. 1B; 120, FIG. 1C). The method shown in FIG. 2A may be performed by, for example, the edge network device. Other components of the systems of FIGS. 1B and 1C may perform all, or a portion, of the method of FIG. 2A without departing from the scope of this disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure.

Initially, in Step 200, path characteristics of a service provider connection on an external facing interface of the edge network device are measured. In one or more embodiments, the path characteristics may be obtained by the edge network device using in-band (e.g., measured properties of a path are piggy backed on existing network traffics) and/or out-of-band (e.g., synthetic probes with different quality of service (QOS) marking for measuring latency, jitter, loss, etc.) techniques. In one or more embodiments, the edge network device may repeatedly measure the path characteristics at a given interval (e.g., every 5 minutes), which may be any amount of time set by a user (e.g., an administrator) of the LAN.

In one or more embodiments, the edge network device may have multiple external facing interfaces that are each connected to a different service provider (or a different point of a same service provider). In the context of one or more embodiments disclosed herein, each of these connections at the external facing interfaces may be referred to as a service provider connection. A detailed illustration of service provider connections is provided below in reference to FIG. 3A.

In one or more embodiments, each edge network device may only measure path characteristics of service provider connections to which it is directly connected through one or more of its external facing interfaces. For example, assume that a WAN has two SPs (e.g., Internet and MPLS) available for the edge network device to reach (i.e., connect with) another edge network device of a different LAN. If the edge network device is directly connected to both of these SPs, it is able to measure path characteristics of both of these SPs and is aware of the existence of both SP connections. However, if the edge network device is directly connected to only the Internet and not the MPLS, it will only be able to measure path characteristics of the Internet connection and not that of the MPLS connection; the edge network device in this scenario will also not be aware that the MPLS connection exists.

In Step 202, the measured path characteristics are stored in the path characteristic database as part of the path information. In one or more embodiments, the edge network device may also generate reachability information to accompany the path characteristics. For example, assume that the edge network device is connected to another edge network device of a different LAN via two different points of an MPLS connection. In addition to storing the path characteristics of the two different points of the MPLS connection, the edge network device will also generate reachability information specifying that two paths (one for each of the two different points of the MPLS connection) exists between itself and the other edge network device of the other LAN. This generated reachability information is stored in the path characteristic database with the measured path characteristics.

In Step 204, the measured path characteristics are shared with other network devices in the same LAN (i.e., in the same site). The reachability information is also shared with the measured path characteristics. In one or more embodiments, the measured path characteristics and the reachability information may be periodically shared with other network devices at an interval (e.g., an interval of every few microseconds, every few seconds, every few minutes, every few days, etc.). This interval may be different within each LAN and may be set by a user (e.g., an administrator) of the LAN.

In one or more embodiments, in the network controller-less configuration of one or more embodiments disclosed herein, the edge network device may share the measured path characteristics and the reachability information locally with other edge network devices within the same LAN (e.g., using mechanisms to sync/share the path characteristics such as, but not limited to, a set of local tunnels established using the LAN network, transmission control protocol/internet protocol (TCP/IP) mechanisms such as border gateway protocol (BGP), etc.). The local tunnels may be built between each edge network device using one or more switching network devices (e.g., 114A-114B, FIG. 1C) for: (i) one edge network device to publish (i.e., share) its measured path characteristics and reachability information to a portion of or all other edge network devices within the same LAN; and (ii) forwarding (i.e., routing) network traffic between edge network devices within the same LAN. In one or more embodiments, the local tunnels may be dynamic path selection (DPS) tunnels. These local tunnels advantageously have a much higher (e.g., >10×) bandwidth than the bandwidth provided by the WAN.

In one or more embodiments, load distribution may be enabled on the local tunnels between the edge network devices of a LAN. The load distribution may be enabled using virtual router redundancy protocol (VRRP). For example, VRRP may be used to configure one of the two edge network devices as a primary device for each virtual LAN (vlan)/network. Alternatively, in one or more embodiments, pre-configured and/or user-based routing protocols and preferences may be used to distribute load between the two edge network devices of a LAN. For example, a load distribution configuration may depend on various factors such as, but are not limited to, SP connections, encryption requirements, the way the LAN network is configured, etc.

In one or more embodiments, in the network controller based configuration of one or more embodiments disclosed herein, the edge network device may also share the measured path characteristics and the reachability information by transmitting both information to a network controller (as described above in reference to FIG. 1B). The measured path characteristics and reachability information may be transmitted to the network controller using in-band techniques (e.g., border gateway protocol (BPG)). The network controller may aggregate all of the measured path characteristics and the reachability information received from various edge network devices into aggregated path information and distribute the aggregated path information to all edge network devices within the system (e.g., 110, FIG. 1B). In one or more embodiments, the network controller may periodically transmit the aggregated path information to each edge network device at an interval. The interval of transmission may be set by a user (e.g., an administrator, a provider, etc.) of the network controller.

In one or more embodiments, upon receipt of the path information (or aggregated path information), each edge network device will store the received path information in the path characteristic database. This advantageously allows each edge network device of a LAN to have a complete picture of all possible paths (e.g., SPs) that can be used for transmitting one or more network traffic to edge network devices of different LANs, which improves the overall system by providing high availability services for the transmission of network traffic between sites in the enterprise network.

Figure 2B:
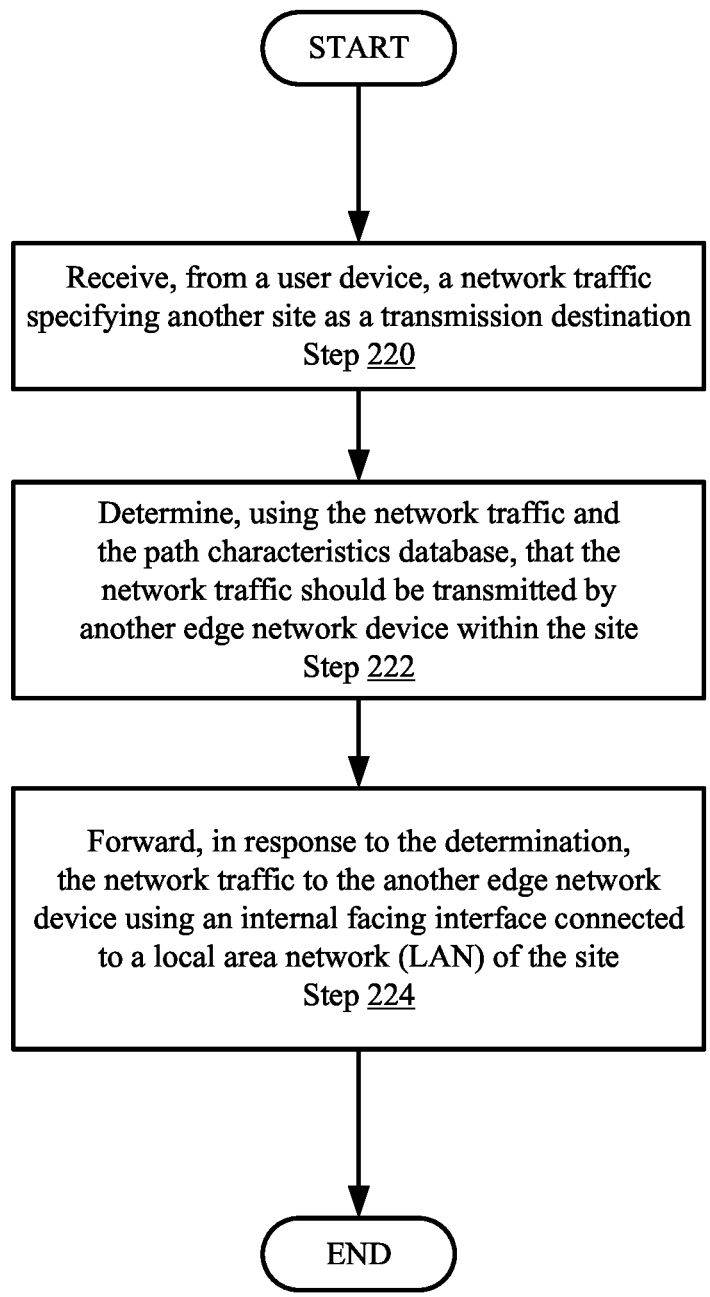

FIG. 2B shows a flowchart of a method in accordance with one or more embodiments of the disclosure. The method depicted in FIG. 2B may be performed to process how network traffic is transmitted by an edge network device (e.g., 113A-103D, FIG. 1B; 120, FIG. 1C). The method shown in FIG. 2B may be performed by, for example, the edge network device. More specifically, the method depicted in FIG. 2B shows processes executed by an edge network device that directly received network traffic (e.g., from a user device) that is to be transmitted across the WAN to another site (i.e., another LAN). Additionally, while FIG. 2B is illustrated as a series of steps, any of the steps may be omitted, performed in a different order, additional steps may be included, and/or any or all of the steps may be performed in a parallel and/or partially overlapping manner without departing from the disclosure.

In Step 220, a network traffic specifying another site (i.e., another LAN) as a transmission destination is received from a client device (e.g., through one or more of the switching network devices) within the LAN. The transmission destination may be specified in a header of the network traffic. In one or more embodiments, the network traffic may also include classification information (also referred to herein as simply "classification") specifying properties (e.g., an application type, details of the payload, size, etc.) of the network traffic. For example, assume that the network traffic is associated with a voice call application on the client device, the classification of the network traffic may specify that the network traffic is a voice traffic of n size associated with a voice call application requiring transmission with low latency. As another example, assume that the network traffic is associated with a video call application on the client device, the classification of the network traffic may specify that the network traffic is a video traffic of m size associated with a video call application requiring transmission with low latency and large bandwidth.

In Step 222, a determination is made that the network traffic should be transmitted by another edge network device within the same LAN. In one or more embodiments, this determination may be made using the classification of the network traffic and the information stored in the path characteristic database. For example, the edge network device may parse the path characteristic database for the reachability information to determine (i.e., identify) all possible paths (e.g., SP connections) that can be used to transmit the network traffic from the LAN to the transmission destination within the other LAN.

In one or more embodiments, after identifying all possible paths that can be used to transmit the network traffic to the other LAN, the edge network device parses the path characteristic database to determine the path characteristics of each of the identified. The edge network device then compares the classification of the network traffic with all of the identified paths and path characteristics to determine an optimal path (within the finite number of identified paths) for transmitting the network traffic to the other LAN.

In the context of one or more embodiments disclosed herein, one of ordinary skill in the art would appreciate that an optimal path refers to application aware paths that take into account objective functions for given application traffic and the constraints that the WAN has to satisfy for such application traffic. For example, network traffic for voice applications (e.g., voice traffic) requires a lowest latency path (i.e., route) while other types of network traffic may instead require a lowest cost path. Therefore, for network traffic associated with voice applications, the optimal path within the finite number of identified paths from the path characteristic database would be one with the lowest latency as specified by the path's path characteristics.

Additionally, one of ordinary skill in the art would also appreciate that the optimal path for a specific network traffic may be different at any given instance in time. In particular, the SP/WAN network (i.e., the combination of the SPs in the WAN) performance characteristics and constraints can be different for different types of applications and can be dynamically changing such that a certain path (e.g., via MPLS or the Internet) between two LANs may be the optimal path for a network traffic being transmitted at one moment in time but may not be at another point in time. As a result, as discussed above, the path information may be continuously measured and the path characteristic database continuously (e.g., periodically every few microseconds, every few seconds, every few minutes, every few days, etc.) updated by the edge network devices to reflect a most up-to-date condition of the SP/WAN network.

In Step 224, in response to the determination in Step 222, the edge network device forwards the network traffic to the other edge network device using an internal facing interface connected to the LAN of the site. In one or more embodiments, the network traffic may be forwarded to the other edge network device using the set of local tunnels established between the edge network devices (using the switching network devices) of the same LAN.

In one or more embodiments, the network traffic forwarded between edge network devices within a same LAN may belong to different virtual routing and forwarding instances (VRFs). In such situations, Dot1q or VXLAN techniques may be used for forwarding these network traffic. Additionally, to avoid dedicating a separate port/link on each edge network device for the network traffic, the network traffic may be encapsulated in VXLAN/DPS (e.g., in the form of tunnel headers) and be transmitted via the regular LAN network. This takes advantage of the dual LAN ports on the edge network devices and redundancy in the LAN network for carrying the network traffic. In one or more embodiments, interior gateway protocol (IGP) may not be needed between the edge network devices of a same LAN. Instead, Ethernet virtual private network (EVPN)/internal BGP (iBGP) may be used to distribute the LAN prefixes between the edge network devices.

In one or more embodiments, if the LAN network is a layer 2 (L2) network, then the VXLAN/DPS encapsulated traffic may be sent over a layer 3 (L3) sub interface. In such a case, a jumbo maximum transmission unit (MTU) may be configured on the L3 sub interface to avoid any MTU reduction for the end to end traffic. In one or more embodiments, if the edge network device is configured as a transfer hub, the connectivity may be L3. Otherwise, the connectivity may be L2.

Figure 2C:
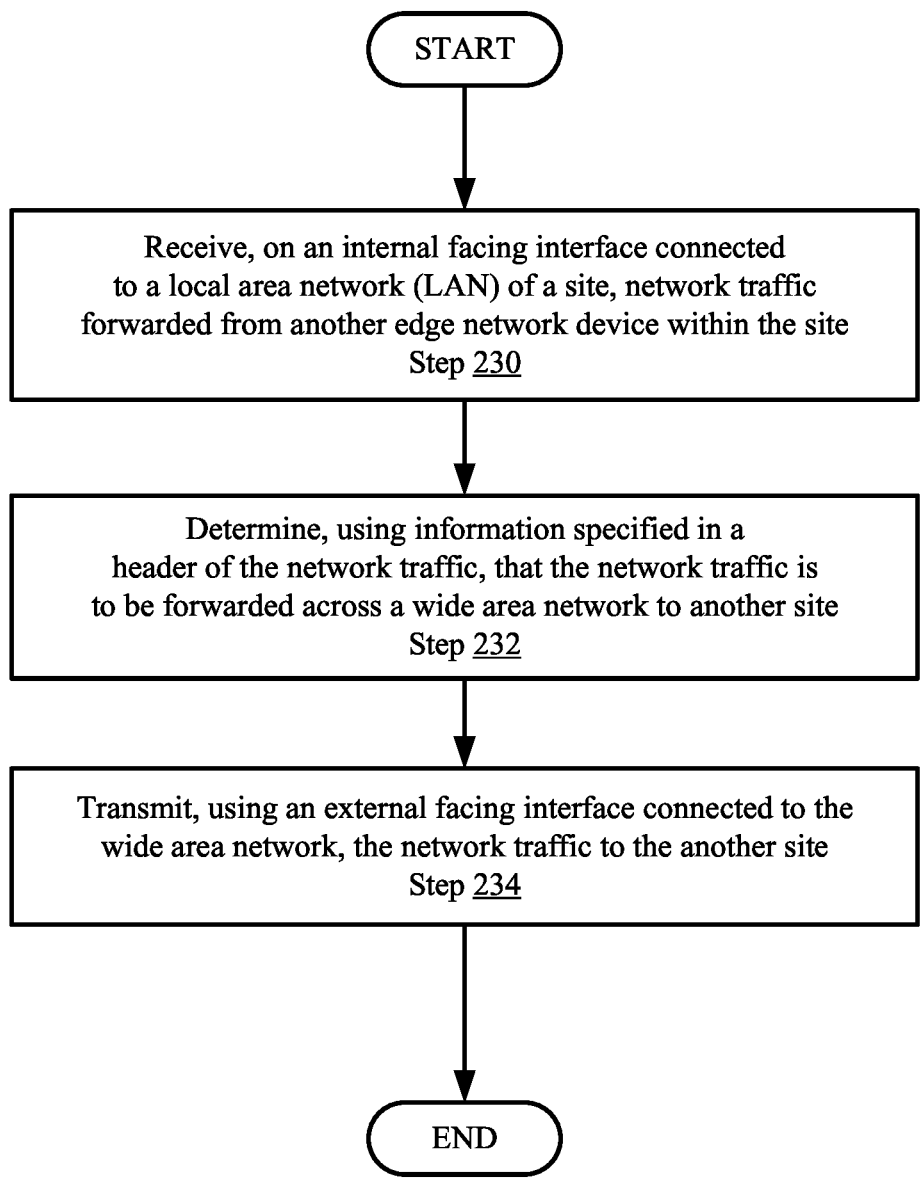

FIG. 2C shows a flowchart of a method in accordance with one or more embodiments of the disclosure. The method depicted in FIG. 2C may be performed to process how network traffic is transmitted by an edge network device (e.g., 113A-103D, FIG. 1B; 120, FIG. 1C). The method shown in FIG. 2C may be performed by, for example, the edge network device. More specifically, the method depicted in FIG. 2C shows processes executed by an edge network device of a first site (i.e., a first LAN) that received network traffic to be transmitted across the WAN to a second site (i.e., a second LAN) from another edge network device of the first site. Additionally, while FIG. 2C is illustrated as a series of steps, any of the steps may be omitted, performed in a different order, additional steps may be included, and/or any or all of the steps may be performed in a parallel and/or partially overlapping manner without departing from the disclosure.

In Step 230, an edge network device receives, on an internal facing interface connected to a LAN of the site in which the edge network device is disposed, network traffic forwarded from another edge network device within the same site. In response to receiving the network traffic on the internal facing interface, the edge network device (in Step 232) determines (e.g., by parsing a header of the network traffic) that the network traffic is to be forwarded (i.e., transmit) across the network to another site having a different LAN.

In one or more embodiments, the header of the forwarded network traffic may specify which SP connection should be used to forward the network traffic across the network. For example, assume the edge network device receiving the forwarded network traffic has two SP connections (one Internet and one MPLS) with the destination LAN. The header of the forwarded network traffic may specify which of these two SP connections has to be used for the transmission of the network traffic.

In Step 234, the external facing interface connected to the WAN is used to transmit the network traffic to the destination LAN (i.e., the other site within the enterprise network). In one or more embodiments, the external facing interface in connection with the SP connection specified in the header of the forwarded network traffic is selected for transmitting the network traffic across the WAN.

Figure 3A:
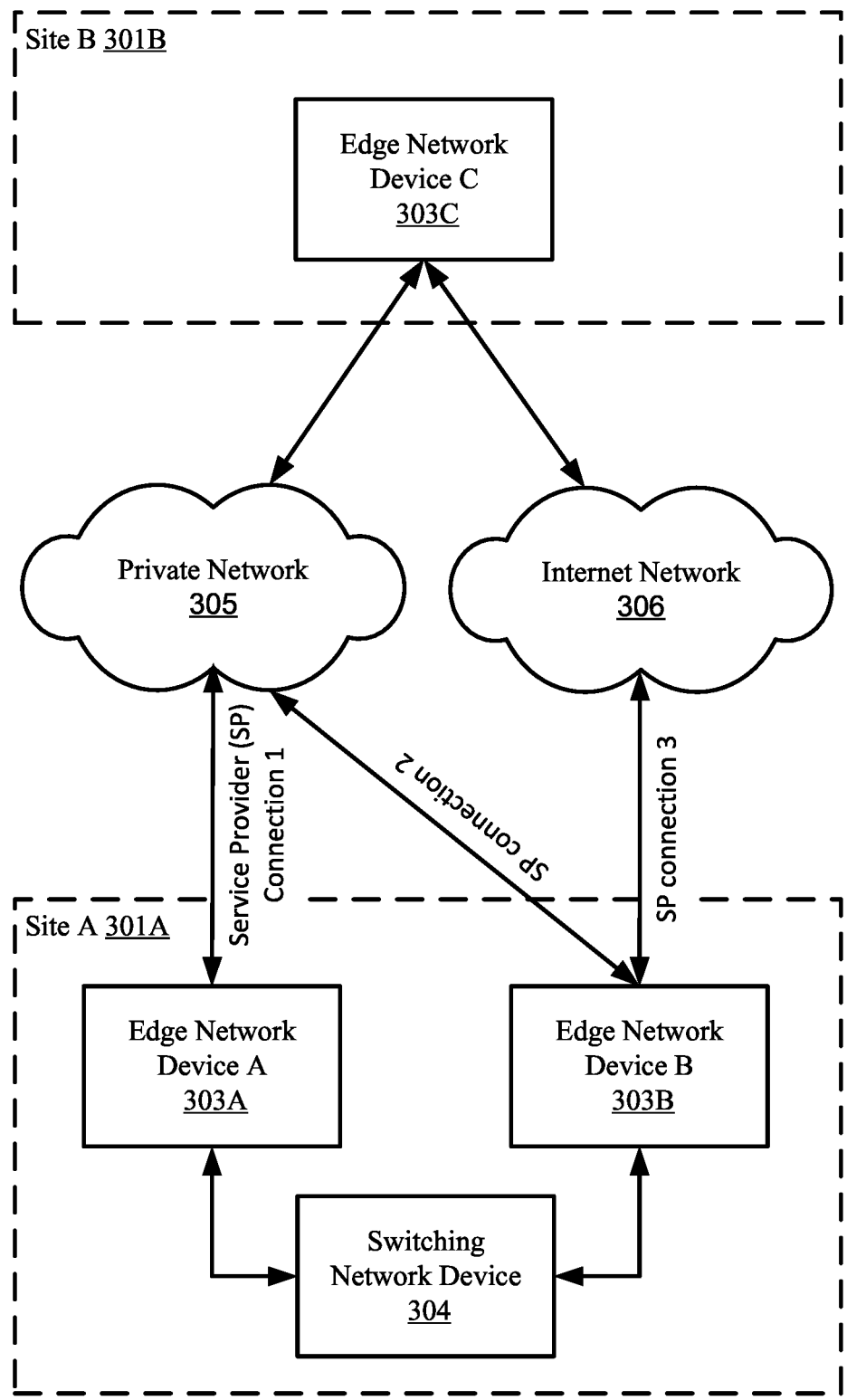
FIGS. 3A-3C show an example in accordance with one or more embodiments described herein.
Figure 3B:
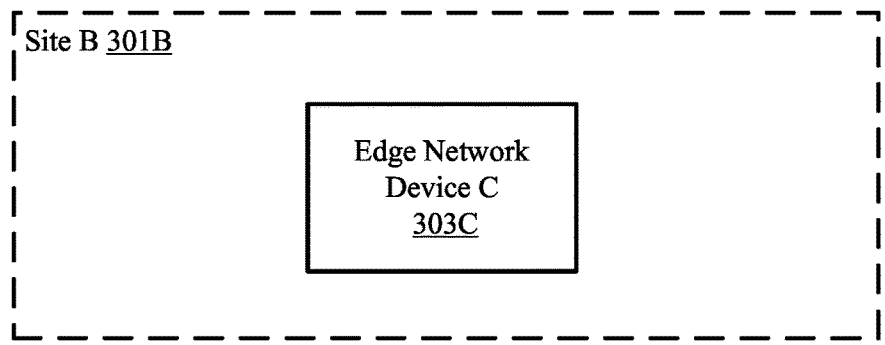
Figure 3B:
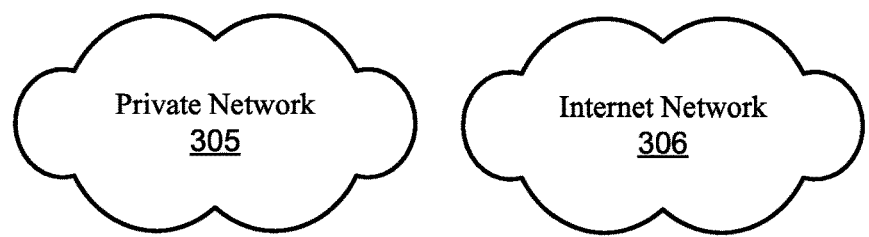
Figure 3B:
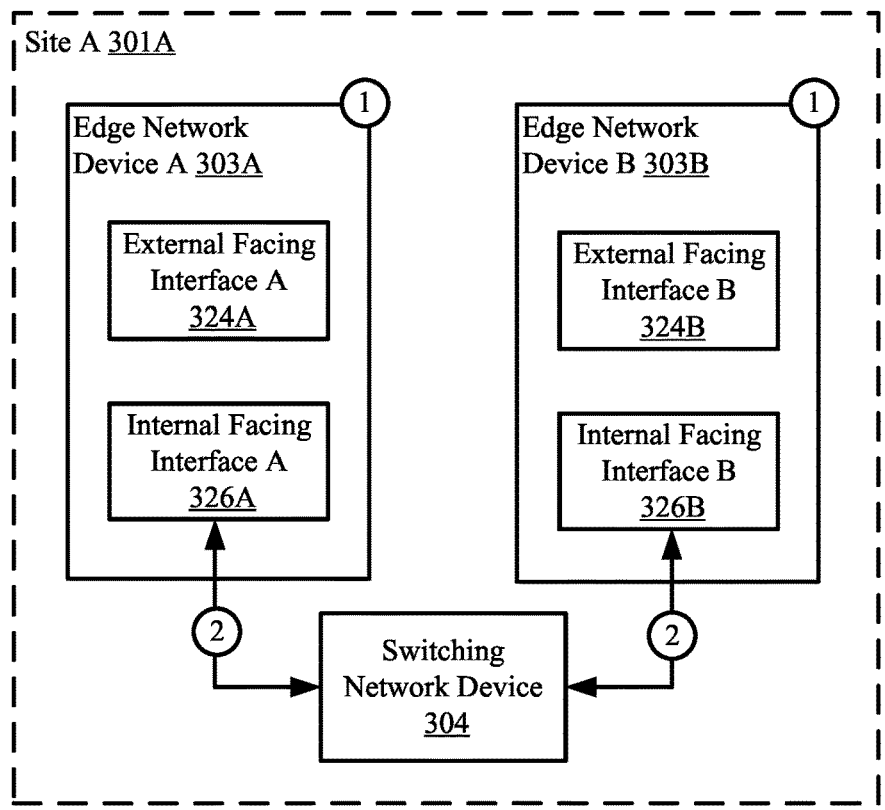
Figure 3C:
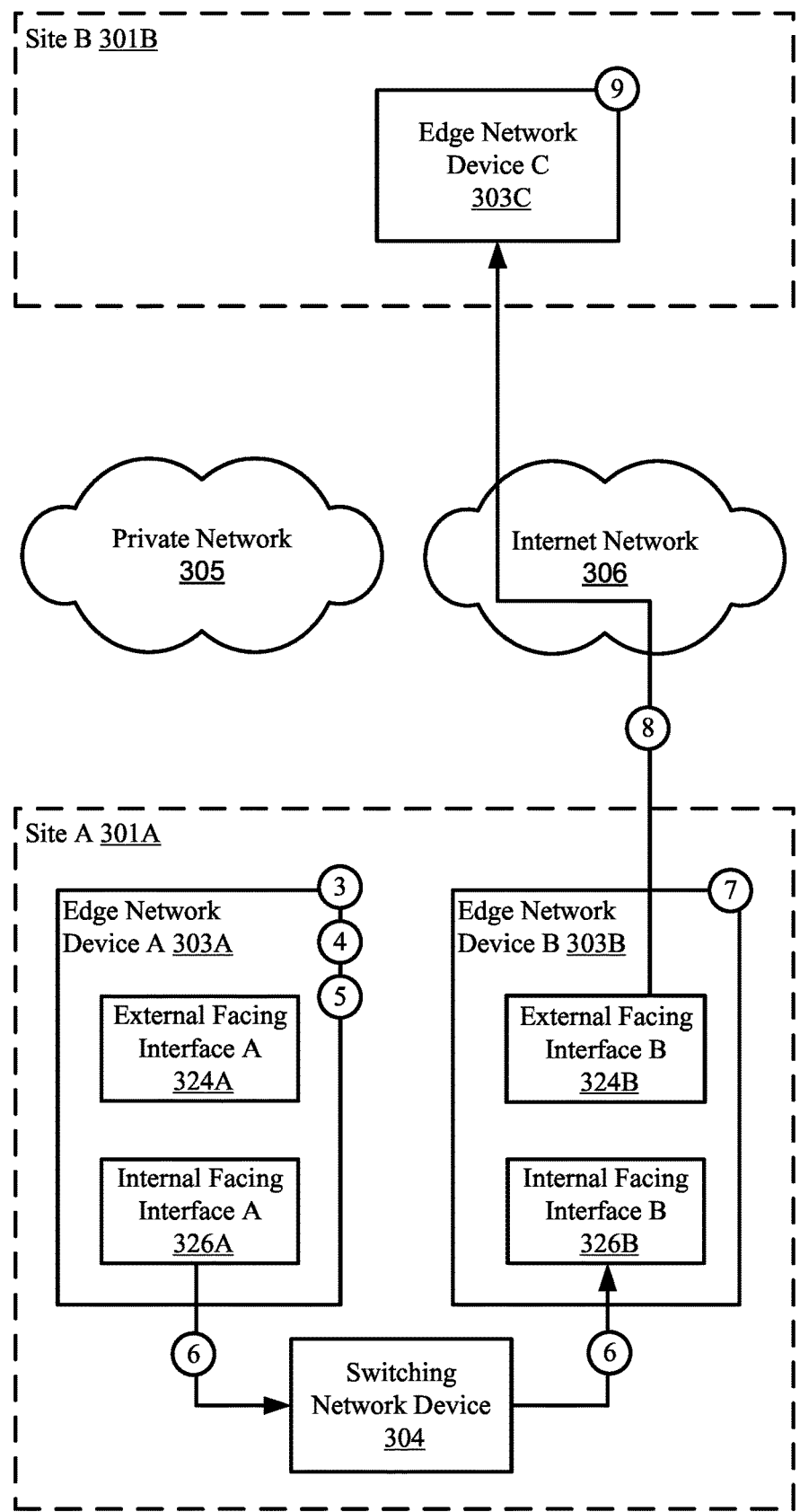

To further clarify embodiments of the disclosure, an example is provided in FIGS. 3A-3C. The numbers in the brackets below, e.g., "[1]", correspond to the same circled numbers in FIGS. 3A-3C.

Start of Example

Initially, assume that an enterprise network has a region (not shown) with a topology shown in FIG. 3A where the region includes two sites (301A, 301B). As shown in the topology of FIG. 3A, site A (301A) includes two edge network devices (edge network device A (303A) and edge network device B (303B)) that are interconnected through a LAN using a switching network device (304). Site B includes a single edge network device C (303C). Referring back to FIG. 1B for context, site A (301A) in FIG. 3A may correspond to LAN A (11A) while site B in FIG. 3A may correspond to LAN B (11B).

As further shown in FIG. 3A, edge network device A (303A) of site A (301A) is connected to edge network device C (303C) using service provider (SP) connection 1 provided by private network (305) (e.g., an MPLS network). On the other hand, edge network device B (303B) of site A (301A) is connected to edge network device C (303C) using both an SP connection 2 through the private network (305) and an SP connection 3 through the Internet network (306). The private network (305) and internetwork network (306) are part of a WAN connection (not shown) (e.g., 115, FIG. 1B).

Further assume, using the topology of FIG. 3A, that prior to publishing each SP connection's path characteristics to one another, edge network device A (303A) is only aware of SP connection 1 while edge network device B (303B) is only aware of SP connection 2 and SP connection 3. Said another way, edge network device A (303A) is not aware that site A (301A) can reach site B (301B) through the Internet network (306).

Turning now to FIG. 3B, each of the edge network device A (303A) and the edge network device B (303B) measures the path characteristics (and concurrently generates the reachability information) for each SP connection (shown in FIG. 3A) to which they have a direct connection [1]. The measured path characteristics (and the reachability information) are then published, by each of the edge network device A (303A) and the edge network device B (303B), within site A (301A) through local tunnels established using the switching network device (304) [2]. At this point, each of the edge network device A (303A) and the edge network device B (303B) is now aware of all possible paths (e.g., SP connections) for reaching the edge network device C (303C) at site B (301B)

At a subsequent point in time, as shown in FIG. 3C, edge network device A (303A) receives a network traffic from a client device (not shown) within site A (301A) with a transmission destination of edge network device C (303C) at site B (301B) [3]. Edge network device A executes a determination to find the optimal path (from among SP connections 1, 2, and 3 shown in FIG. 3A) at the given moment for transmitting the network traffic to edge network device C (303C) [4]. Edge network device A determines that the optimal path is SP connection 3 through the Internet connection (306) that is only available on edge network device B (303B) [5].

Still referring to FIG. 3C, edge network device A (303A) forwards the network traffic, using the internal facing interface A (326A) and through the local tunnels through switching network device (304), to edge network device B (303B) [6]. Edge network device B (303B) receives the forwarded network traffic on its internal facing interface B (326B) and determines that the network traffic is to be forwarded to edge network device C (303C) at site B (301B) using SP connection 3 through the Internet network (306) [7]. Edge network device B (303B) forwards the network traffic on SP connection 3 through the Internet network (306) [8]. Finally, edge network device C (303C) at site B (301B) receives the forwarded network traffic and processes the network traffic [9].

End of Example

Figure 4:
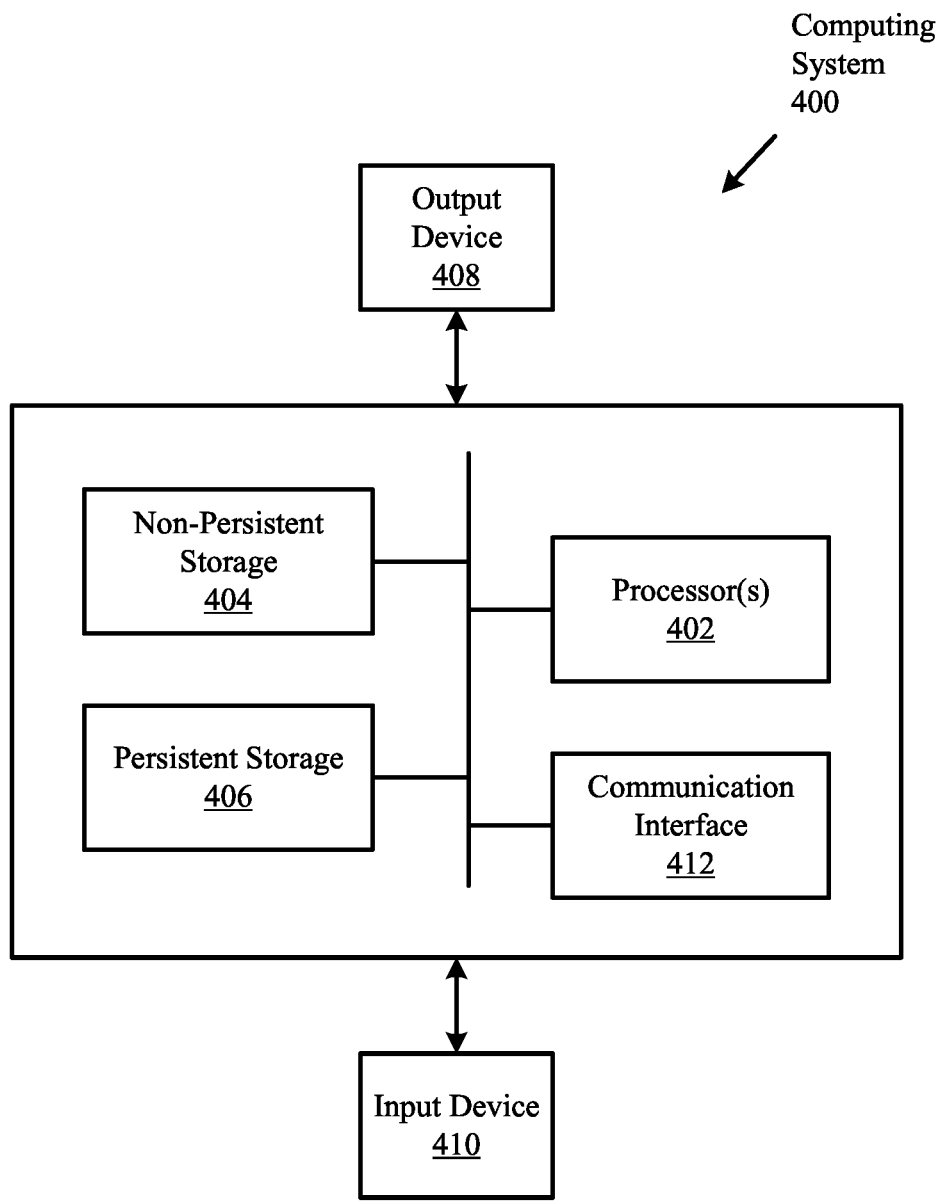
FIG. 4 shows a diagram of a computing device in accordance with one or more embodiments described herein.

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired and/or wireless directly between two devices or components) or indirect (e.g., wired and/or wireless connections between any number of devices or components connecting the connected devices) connection. Thus, any path through which information may travel may be considered a connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. An edge network device comprising:
a storage; and
a processor connected to the storage, wherein:
the edge network device is a first edge network device of a first site connected to a wide area network (WAN) and the first site further comprises a second edge network device,
the WAN further comprises a second site connected to the first site, and
the first edge network device is configured to:
receive network traffic, wherein the first edge network device is associated with a first service provider connection;
determine that the network traffic should be transmitted using a second service provider connection associated with the second edge network device of the first site,
wherein the second edge network device is connected to the first edge network device via a local area network (LAN),
wherein the determination is based on comparing path characteristics of the first service provider connection, path characteristics of the second service provider connection, and a classification of the network traffic, and
wherein the path characteristics of the second service provider connection is shared with the first edge network device; and
forward, in response to the determination, the network traffic to the second edge network device across a local tunnel over the LAN such that the network traffic is transmitted across the WAN to the second site by the second edge network device, wherein the local tunnel over the LAN forms a connection between the first and second edge network devices.

2. The edge network device of claim 1, wherein:
the path characteristics of the second service provider connection is shared with the first edge network device using the LAN,
the first edge network device if further configured to store, in a storage, the path characteristics of the first service provider connection and the path characteristics of the second service provider connection, and
determining, by the first edge network device, that the network traffic should be transmitted using the second service provider connection comprises:
making a first determination, based on the classification of the network traffic, that the network traffic is a voice traffic;
making a second determination, based on comparing the path characteristics of the first service provider connection and the path characteristics of the second service provider connection, that the second service provider connection has a lower latency than the first service provider connection; and making a third determination, based on the first and second determinations, that the voice traffic should be transmitted over the second service provider connection with the lower latency.

3. The edge network device of claim 2, wherein the second service provider connection is provided by a same service provider as that of the first service provider connection.

4. The edge network device of claim 2, wherein the first service provider connection is provided by a first service provider and the second service provider connection is provided by a second service provider different from the first service provider.

5. The edge network device of claim 1, wherein:
the path characteristics of the second service provider connection is shared with the first edge network device by a network controller that transmits the path characteristics of the second service provider connection to the first edge network device.

6. A method for transmitting network traffic across a wide area network (WAN) from a first site within the WAN to a second site within the WAN, wherein the method is executed by a first edge network device at the first site, the first site further comprises a second edge network device, and the method comprises:
receiving the network traffic from a client device associated with the first edge network device at the first site, wherein the network traffic specifies the second site as a transmission destination;
determining, using path characteristics and a classification of the network traffic, that the network traffic should be transmitted by the second edge network device instead of the first edge network device; and
transmitting, in response to the determination, the network traffic to the second edge network device using a local tunnel over a local area network (LAN) of the first site such that the network traffic is transmitted to the second site by the second edge network device, wherein the local tunnel over the LAN forms a connection between the first and second edge network devices.

7. The method of claim 6, wherein:
the first edge network device is connected to the second site through a first service provider connection and the second edge network device is connected to the second site through a second service provider connection, and
the path characteristics database comprises path characteristics of the first service provider connection and path characteristics of the second service provider connection.

8. The method of claim 7, wherein:
the first service provider connection is Internet or multiprotocol label switching (MPLS), and
the second service provider connection is Internet or multiprotocol label switching (MPLS).

9. The method of claim 7, wherein:
the first service provider connection is Internet or MPLS, and the second service provider connection is the other one of the Internet or MPLS.

10. The method of claim 7, wherein the method further comprises:
periodically measuring the path characteristics of the first service provider connection and updating the path characteristic database with the measured path characteristics of the first service provider connection,
wherein the path characteristics of the second service provider connection are periodically shared with the first edge network device from the second edge network device.

11. The method of claim 10, wherein the path characteristics of the second service provider connection are periodically shared with the first edge network device from the second edge network device using the LAN.

12. The method of claim 10, wherein the method further comprises:
periodically transmitting the path characteristics of the first service provider connection to a network controller on the WAN;
periodically receiving, from the network controller, aggregated path characteristics comprising the path characteristics of the first service provider connection and the path characteristics of the second service provider connection; and
storing the received aggregated path characteristics in the path characteristics database.

13. The method of claim 10, wherein, within the first site, only the first edge network device can measure the path characteristics of the first service provider connection and only the second edge network device can measure the path characteristics of the second service provider connection.

14. The method of claim 10, wherein determining that the network traffic should be transmitted by the second edge network device comprises:
making a first determination, based on the classification of the network traffic, that the network traffic is a video traffic;
making a second determination, based on comparing the path characteristics of the first service provider connection and the path characteristics of the second service provider connection, that the second service provider connection has a lower latency and larger bandwidth than the first service provider connection; and
making a third determination, based on the first and second determinations, that the video traffic should be transmitted over the second service provider connection with the lower latency and large bandwidth.

15. The method of claim 6, wherein transmitting the network traffic to the second edge network device using the local tunnel over the LAN of the first site comprises:
encapsulating the network traffic to include a tunnel header; and
transmitting the encapsulated network traffic to the second edge network device using the local tunnel.

16. A method for transmitting network traffic across a wide area network (WAN) from a first site within the WAN to a second site within the WAN, wherein the method is executed by a second edge network device of the first site that also comprises a first edge network device connected to the second edge network device via a local area network (LAN) of the first site, and the method comprises:
transmitting, to the first edge network device across a local tunnel over the LAN, path characteristics of a service provider connection at the second edge network device that connects the second edge network device to the second site;
receiving, after transmitting the path characteristics, network traffic from the first edge network device across the local tunnel over the LAN, wherein the network traffic specifies the second site as a transmission destination, and wherein the network traffic originates from a client device associated with the first edge network device;

determining that the network traffic should be forwarded across the WAN to the second site using the service provider connection at the second edge network device; and transmitting, in response to the determination, the network traffic across the WAN to the second site using the service provider connection at the second edge network device.

17. The method of claim 16, wherein:

the first edge network device is connected to the second site through an additional service provider connection.

18. The method of claim 17, further comprising periodically measuring, by the second edge network device, the path characteristics of the service provider connection and updating a path characteristic database with the measured path characteristics of the service provider connection, wherein path characteristics of the additional service provider connection are periodically shared with the second edge network device from the first edge network device.

19. The method of claim 16, wherein determining that the network traffic should be forwarded across the WAN to the second site using the service provider connection at the second edge network device comprises:

parsing a header of the network traffic and determining that the header of the network traffic specifies the service provider connection at the second edge network device.

20. The method of claim 16, wherein the network traffic is encapsulated, by the first edge network device, to include a virtual extensible LAN (VXLAN)/dynamic path selection (DPS) (VXLAN/DPS) header, and the local tunnel comprises a DPS tunnel over the LAN and the encapsulated network traffic is transmitted from the first edge network device to the second edge network device using the DPS tunnel.

* * * * *